US006769046B2

United States Patent
Adams et al.

(10) Patent No.: US 6,769,046 B2
(45) Date of Patent: Jul. 27, 2004

(54) SYSTEM-RESOURCE ROUTER (75) Inventors: Lyle E. Adams, San Jose, CA (US); Billy D. Mills, Windsor, CO (US)

(73) Assignee: Palmchip Corporation, San Jose, CA (US)

( * ) Notice: Subject to any disclaimer, the term of this patent is extended or adjusted under 35 U.S.C. 154(b) by 420 days.

(21) Appl. No.: 09/731,070

(22) Filed: Dec. 5, 2000

(65) Prior Publication Data

US 2001/0042147 A1 Nov. 15, 2001

Related U.S. Application Data (60) Provisional application No. 60/182,406, filed on Feb. 14, 2000.

(51) Int. Cl.[7] .............................................. G06F 13/00
(52) U.S. Cl. ........................................ 710/316; 710/38
(58) Field of Search .......................... 710/38, 316, 317; 709/238, 239

(56) References Cited

U.S. PATENT DOCUMENTS

| | | | | |
|---|---|---|---|---|
| 4,001,784 A | * | 1/1977 | Bardotti ........................ | 710/42 |
| 5,261,059 A | * | 11/1993 | Hedberg et al. ............. | 710/317 |
| 5,574,849 A | * | 11/1996 | Sonnier et al. ................ | 714/12 |
| 5,604,865 A | * | 2/1997 | Lentz et al. .................. | 710/316 |
| 5,729,763 A | * | 3/1998 | Leshem ......................... | 710/38 |
| 5,815,680 A | * | 9/1998 | Okumura et al. ............ | 710/316 |
| 6,078,953 A | * | 6/2000 | Vaid et al. ................... | 709/223 |
| 6,332,165 B1 | * | 12/2001 | Hagersten et al. ........... | 709/238 |
| 6,523,088 B2 | * | 2/2003 | Fujimoto et al. ............ | 711/114 |
| 6,535,960 B1 | * | 3/2003 | Nishida et al. .............. | 711/129 |
| 6,542,954 B1 | * | 4/2003 | Aruga ........................... | 710/316 |
| 6,574,687 B1 | * | 6/2003 | Teachout et al. .............. | 710/38 |
| 2001/0014923 A1 | * | 8/2001 | Inoue ........................... | 710/38 |
| 2002/0095549 A1 | * | 7/2002 | Matsunami et al. ......... | 711/114 |
| 2002/0129188 A1 | * | 9/2002 | Fleck et al. ................. | 710/316 |

* cited by examiner

*Primary Examiner*—Paul R. Myers
(74) *Attorney, Agent, or Firm*—Booth & Wright LLP; Matthew J. Booth; Karen S. Wright (57) ABSTRACT

A system resource router interfaces initiators through protocol-adapting sockets to a plurality of sub-buses. A switch matrix allows at least some of the sockets to be connected to two or more of the sub-buses. Each sub-bus interfaces through a channel controller to target devices like memory and peripherals. A graphical user interface, assembly program, and computer-aided design platform allow users to customize system resource router configurations for particular applications. At least one embodiment produces Verilog or other hardware description language intellectual property technology libraries. It implements the optimal mix of sub-buses, switches, sockets, and controllers that will be needed for a particular user application.

4 Claims, 4 Drawing Sheets

SYSTEM-RESOURCE ROUTER

CROSS REFERENCE TO RELATED APPLICATIONS

This application claims the benefits of the earlier filed U.S. Provisional Application Serial No. 60/182,406, filed Feb. 14, 2000 (01.20.2000), which is incorporated by reference for all purposes into this specification.

BACKGROUND OF THE INVENTION

1. Field of the Invention

The present invention relates generally to electronic circuits, and more specifically to functional modules on a single semiconductor integrated circuit.

2. Description of the Prior Art

The semiconductor art has advanced to the point where whole systems are preferably integrated onto a single-chip device. Processing speeds and architectures are such that very wide buses operated at near gigaHertz speeds are routinely used to interface processors, peripherals, and memory. Single-chip system-on-chip (SOC) implementations now permit several such buses to be switched between resources. Off chip, such a bus switch architecture would be impractical.

Palmchip Corporation (San Jose, Calif.) markets its COREFRAME™ products to be low-power, high-performance, processor independent, flexible on-chip interconnect architectures for integration of system-on-chip (SOC) blocks in a synthesis-friendly environment. CORE-FRAME designs combine different processors, systems with resource routers and dynamic bandwidth allocation, systems with multiple clock domains, and systems with a non-memory shared resource and without a processor. CORE-FRAME can interface between multiple bus standards, as well as fast and slow non-DMA devices on a single channel.

Von Neumann and Harvard are two of the most common computer types in use today. A Von Neumann architecture processor uses the same external buses for instruction fetches and data operations in a shared arrangement. A Harvard architecture processor uses separate buses for instruction fetches and data operations. Most digital signal processor (DSP) designs today use the Harvard architecture because the performance benefits far outweigh the cost of adding extra wires and pins.

A simple bus architecture is basically a modified external bus standard using unidirectional buses for on-chip data transfers, e.g., separate read data and write data busses. There are several variations of this basic theme, for example, the peripherals may be bridged directly off the CPU or the peripheral bus may be removed entirely and the slower peripheral targets may be mixed with the fast targets on the high-speed bus. There are many variations in bus protocol, and arbitration, that try to optimize the throughput, all data passes over the same wires and there is no parallelism. The bandwidth is simply determined by the width of the data path and the clock frequency. In order to increase bandwidth, the width of the data path and/or clock frequency must be increased. But these increases only work up to the point where most transfers in a typical system are not a full data path wide.

When placing and routing this architecture the high-speed bus must run to all the initiators and targets, which usually means that this bus must run all the way across the chip. In order to keep the high-speed bus running at high speed, special layout techniques must be used which will kill the time to market advantages of system-on-chip design.

A variation of the simple bus architecture uses multiple high speed buses with a bridges between them and thereby allows some parallelism. Transactions on bus-A can proceed at the same time bus-B is busy. But still has the same problem as above in that each initiator can still talk to each target across the bridge. This means the bus still routes across the chip and will have problems at high clock frequencies. In addition when an initiator on bus-A talks to a target on bus B both bus-A and bus-B are tied up. The bridge also adds two levels of logic to the data, address, and control signals making it the limiting factor for performance.

The point-to-point architecture can only be used to its fullest in on-chip designs due to package-pin limitations. In this architecture multiple initiators connect directly to each target through a switching network. Each initiator must arbitrate for the target, but once connected the transfers occur at full bandwidth. The number of target devices determines the maximum bandwidth. This architecture removes many of the disadvantages of the simple bus architecture in that the unnecessary connections are eliminated and portions of the switching network are routed locally. Transactions can operate in parallel. A disadvantage of the point-to-point architecture is the number of accessible target devices is limited. As more and more targets are added, the switching network becomes more difficult to implement. Changes to the switching network in the middle of the design become practically impossible.

SUMMARY OF THE PRESENT INVENTION

It is therefore an object of the present invention to provide a system-on-chip interconnection structure and method for efficient integration of a variety of functional circuits.

It is a further object of the present invention to provide an on-chip interconnect architecture that standardizes how systems-on-chip are fabricated on silicon semiconductor integrated circuit chips.

Briefly, a system resource router embodiment of the present invention interfaces initiators through protocol adapting sockets to a plurality of sub-buses. A switch matrix allows at least some of the sockets to be connected to two or more of the sub-buses. Each sub-bus interfaces through a channel controller to target devices like memory and peripherals. A graphical user interface, assembly program, and computer-aided design platform allow users to customize system resource router configurations for particular applications. At least one embodiment produces Verilog or other hardware description language intellectual property technology libraries. It implements the optimal mix of sub-buses, switches, sockets, and controllers that will be needed for a particular user application.

An advantage of the present invention is that a system resource router is provided that divides a high-speed bus into M-channel sub busses and uses switches at initiator sockets to connect to the different M-channels.

Another advantage of the present invention is that while dividing a high bus into M-channel sub busses erroneous connections can be removed and each M-channel sub bus can be routed locally.

Another advantage of the present invention is that a system resource router is provided that allows different initiator-to-target or memory transactions to occur simultaneously across different M-channels.

A further advantage of the present invention is that a system resource router is provided that increases the bandwidth of the system without resorting to larger bus widths or higher clock frequencies.

These and other objects and advantages of the present invention will no doubt become obvious to those of ordinary skill in the art after having read the following detailed description of the preferred embodiments which are illustrated in the drawings.

DETAILED DESCRIPTION OF THE PREFERRED EMBODIMENTS

Figure 1:
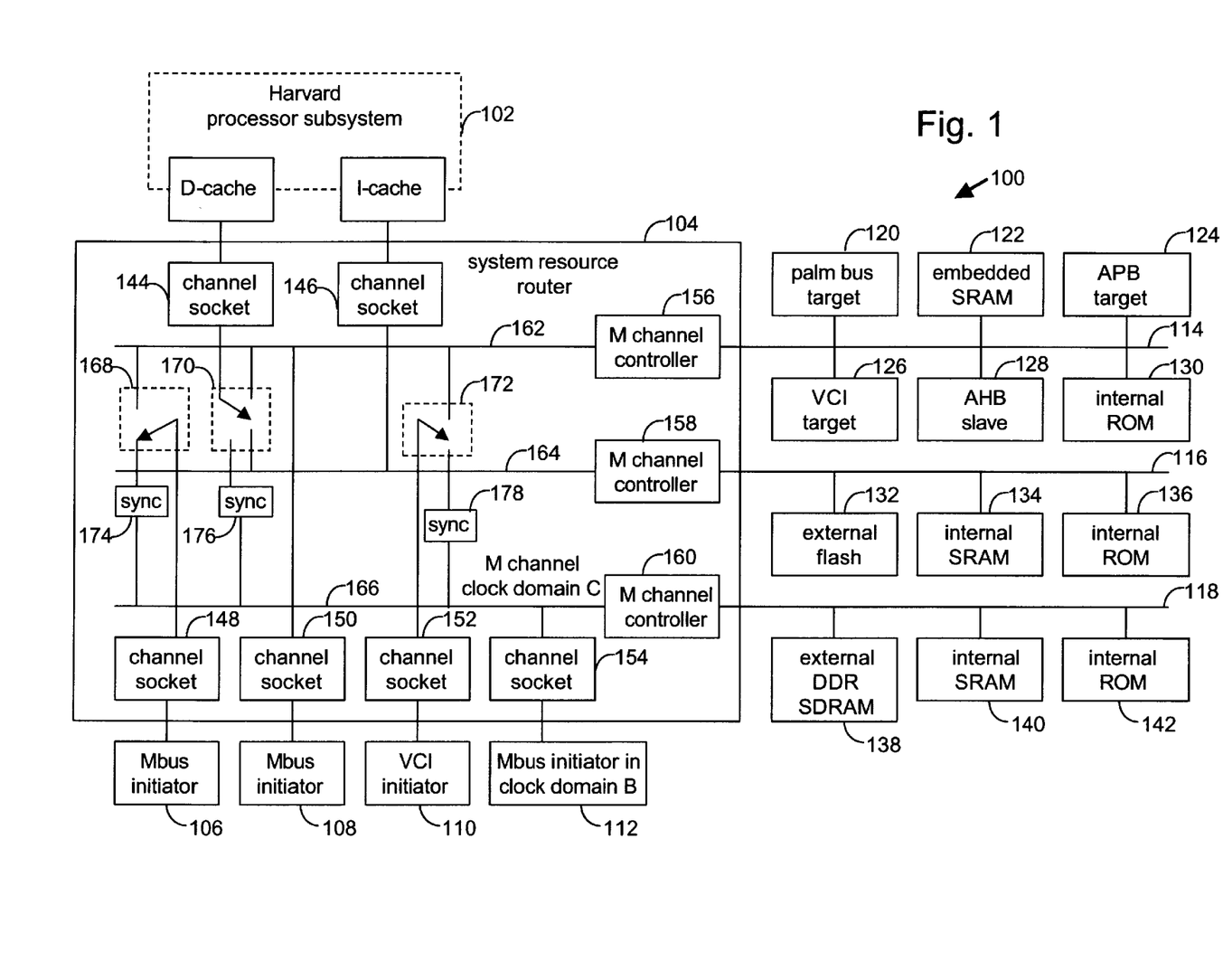
FIG. 1 is a functional block diagram of computer system embodiment of the present invention for system-on-chip with system-resource routing.

FIG. 1 shows a computer system embodiment of the present invention, and is referred to herein by the general reference numeral 100. The system 100 comprises a Harvard-architecture processor subsystem 102 connected through a system resource router 104 to a variety of resources on several buses. The system resource router 104 interfaces to a mix of bus initiators 106, 108, 110, and 112 through channel sockets. It further interfaces to M-channel buses, e.g., a set of three M-channel buses 114, 116, and 118.

The M-channel bus 114 is shown with a typical complement of resources, e.g., a PalmBus target 120, an embedded static random access memory (SRAM) 122, an MBUS target 124, a virtual component interface (VCI) target 126, a PVCI target 128, and an internal read-only memory (ROM) 130. The M-channel bus 116 is shown with another typical complement of resources, e.g., an external flash memory 132, an internal SRAM 134, and an internal ROM 136. The third M-channel bus 118 is shown with an external double data rate (DDR) single data rate random access memory (SDRAM) 138, an internal SRAM 140, and an internal ROM 142. The way the M-channel buses are populated in FIG. 1 is merely for discussion here, such examples help illustrate all the many ways the M-channel buses could be populated and how they would function in embodiments of the present invention.

The socket interfaces can incorporate industry standards, e.g., PalmBus, VCI, or PVCI. The target devices could be PCI slave interfaces that allow a bridge from an initiator peripheral PCI master to connect two PCI buses. The initiator sockets are preferably an MBUS initiator, an AHB master, or a VCI initiator. The on-chip RAM could be used as a shared resource by the CPU or initiator devices. With the correct on-chip control, any of these sockets could be mixed or matched. Such variations are preferably implemented with conventional devices and methods.

The system resource router 104 allows multiple initiator devices, e.g., master or DMA device and processors, to communicate through separate M-channel connections simultaneously with multiple target devices, e.g., slave devices and memory. Initiator and target devices connect to the M-channels through sockets 144, 146, 148, 150, 152, and 154. Each such socket handles all protocol, clock domain, address remap, and bandwidth matching issues. A set of M-channel controllers 156, 158, and 160, respectively interface an internal set of buses 162, 164, and 166 to the M-channel buses 114, 116, and 118. A group of associated bus transfer switches 168, 170, and 172 variously connect the sockets to the M-channel controllers 156, 158, and 160. Channel sockets 146, 150, and 154 are exemplary of those that are connected directly to a dedicated M-channel controller and bus. Bus 166 is a syncronous bus, and is therefore interfaced with syncronous devices connected to a clock that may be run asynchronously from the clock used on bus 166 through syncronizers 174, 176, and 178.

Two-pole transfer switch 168 allows channel socket-148 to connect to either bus 162 or syncronously to bus 166. Similarly, three-pole switch 170 allows channel socket-144 to connect to either bus 162, bus 164, or syncronously to bus 166. Two-pole transfer switch 172 allows channel socket-152 to connect to either bus 162 or syncronously to bus 166. These switches are controlled such that available buses accessible to each switch can provide a master with a data transfer path with an acceptable slave. In other instances, a particular resource on an M-channel bus 114, 116, or 118 is connected to the initiator by setting the switches appropriately.

System resource router 104 can function like a memory controller which connects external memory and routes on-chip memory. In addition it can connect target devices and other on-chip resources to initiator devices, CPUs, and DSPs. Initiator devices and CPUs (masters) supply a request and an address to a system resource router controller. Such address includes an M-channel identifier, a target device address, a memory bank address, and/or the memory-cell location address.

The initiator or CPU waits to be granted access before transferring data. Access is granted when the requested M-channel, device is free. Another initiator peripheral or CPU can simultaneously transfer data over a different M-channel while a data transfer is in-progress on the first channel. For example, the Harvard architecture instruction cache (I-cache) in subsystem 102 in FIG. 1 can fetch instructions from the internal ROM 136 while the CPU data cache (D-cache) is simultaneously accessing data from the SDRAM 122.

The system resource router 102 is preferably used in PalmChip (San Jose, Calif.) COREFRAME implementations for higher wide bandwidth applications. For example, a COREFRAME system with a 32-bit PalmBus and a 32-bit external SDRAM running at 100 MHz provides 600 MB/s of available bandwidth on-chip, i.e., 200 MB/s on the PalmBus and 400 MB/s on the M-channel. Adding a separate M-channel for a 32-bit external flash provides 1.0 GB/s of total on-chip bandwidth at 100 Mhz, 200 MB/s on the PalmBus, plus 400 MB/s on each of the channels. Adding a 128-bit internal dual-port RAM channel and changing from a SDR SDRAM to a DDR SDRAM 64-bit DIMM channel yields 3.8 GB/s of bandwidth at 100 MHz, i.e., 200 MB/s on the PalmBus, 400 MB/s on the flash-memory port, plus 1.6 GB/s on each of the other M-channels.

A graphical user interface (GUI) is included in some embodiments of the present invention that assists in system-on-chip design implementations that include a system resource router 102. Practical system resource routers 102 that are preferably implemented with current semiconductor technology allow as many as eight multiple targets to be connected to an M-channel, and up to eight separate M-channels, sixty-four target devices can thus be connected. The configurable design and the easy to use GUI handle the implementation details. The system resource router M-channel can be configured like a simple point-to-point architecture by connecting only one target to the channel. This approach is preferred when there is only external memory because it maximizes data throughput.

The system resource router 102 can therefore be used in COREFRAME and other system-on-chip implementations to reduce shared memory and initiator/target transfer bottlenecks. With a system resource router, a CPU can execute from flash-memory while simultaneously processing data from an initiator peripheral in the SDRAM. The DSP can at the same time process data from the dual-port RAM while another peripheral is transferring data to or from the RAM. With a resource router, no changes to any blocks except the resource router are needed for the processors and initiator peripherals to take best advantage of the available bandwidth.

When more than one initiator or CPU wants to transfer data at the same time across the M-channel, the devices must arbitrate for the channel. The device with the highest priority will ordinarily be granted the channel. Slow and fast devices can be mixed on a single channel by using split transactions.

Computer automated design (CAD) tools are a modern necessity for complex system-on-chip designs. In order to allow the user the necessary flexibly and ease of use to design system on-chip ICs, preferred embodiments of the system resource router provide several methods to configure to exactly what the user desires. A first method of configuring the system resource router uses the chip-assembly program. Such program preferably allows the selection of the number of banks, default type of memory for each bank, and size (width and depth) of memory for each memory bank. The user can select the number of M-channels to place, whether or not syncing FIFOs or synced FIFOs are needed to match the initiator operating frequency to the system resource router frequency, the types of bus interface to the command port needed, the types of bus interface for each initiator, the types of interface for each target, and the type of bus arbitration appropriate for each M-channel.

A second method of configuring the system resource router includes programming a set of configuration registers through a command port. Such allows changes to be made to memory size, memory types, and memory timing. These changes are preferably made after the device has been synthesized and delivered by simply modifying the intellectual property (IP) software.

Detailed user/designer options for a system-resource-router assembly program embodiment of the present invention are summarized in Tables I–VI. Users are preferably allowed to modify system resource router configurations to meet changing application requirements even after the device has been delivered to the end user. In any event, all embodiments of the present invention must provide designs that are compact and easy to use.

TABLE I

Initiator Socket Options

| | | | |
|---|---|---|---|
| initiator sockets | 1, 32 sockets | | |
| data width | 16, 32, 64, 128-bits | | |
| socket interface | COREFRAME MBus | VCI | AHB multi-master or DMA |
| bandwidth matching | ½, ¼, 2, 4 | | |
| address remapping | 8 separate sectors (programmable optional) | | |
| clock domain syncing | asyncronous clock domain | syncronous clock domain | |

TABLE II

Target Socket Options

| | | |
|---|---|---|
| initiator sockets | 1, 8 sockets | |
| port width | 16, 32, 64, 128-bits | |
| bandwidth matching | ½,¼, 2, 4 | |
| address remapping | 8 separate sectors (programmable optional) | |
| clock domain syncing | asyncronous clock domain | syncronous clock domain |

TABLE III

M-channel Socket Options

| | | |
|---|---|---|
| initiator sockets | 1, 8 sockets | |
| port width | 16, 32, 64, 128-bits | |
| bandwidth matching | ½,¼, 2, 4 | |
| address remapping | 8 separate sectors (programmable optional) | |
| clock domain syncing | asyncronous clock domain | syncronous clock domain |

TABLE IV

M-channel Options

| | | |
|---|---|---|
| number of channels | 1, 8 full bandwidth channels | |
| channel type | external and embedded memory | embedded memory and target |
| starting address | user selectable | |
| channel width | 16, 32, 64,128-bits | |
| arbitration type | round-robin; fixed; timed, round-robin with 1 fixed, time domain slicing | |
| watch dog timer | selectable | |
| clock domain syncing | asynchronous clock domain | syncronous clock domain |
| address remapping | 8 separate sectors (programmable optional) | |
| if embedded and target channel type is selected then full duplex protocol and split transactions become options | | |

TABLE V

Command Port Options

| bus width | 16, 32-bits | | |
|---|---|---|---|
| bus interface | COREFRAME PalmBus ™ | PVCI | APB |

TABLE VI

Memory Bank

| memory banks | 1–8 memory banks | | | | | |
|---|---|---|---|---|---|---|
| starting address of each memory bank | | | | | | |
| memory width | 8-bits (all async memory banks) | 16 bits | 32-bits | 64-bits | 72 bits ECC DDR SDRAM | |
| memory depth | 128 Kb–128 Mb | | | | | |
| memory type | SDR or DDR SDRAM | EDO | flash-memory or Sflash | compact flash-memory | internal or external SRAM or SSRAM | internal or external ROM | SIMM | DIMM | if DDR SDRAM is selected, 72-bit ECC is an option
if SDRAM or EDO are selected, refresh timer is an option
if SIMM is selected, presence detect is an option
if SDRAM is selected, a serial presence detect port is an option System resource router embodiments of the present invention include channel switches, M-channels, and channel sockets. The channel switches handle connections to the different M-channels which actually transfer the data. The sockets do the interfacing chores and make the reuse of IP-products possible. The system resource router uses a socket/channel technology that allows different protocols to be used between the initiator and target device to move the data. Optimized protocols are implemented to move certain types of data, e.g., external memory accesses or initiator-to-target, that keep the initiator/target interfaces simple. The ability to mix protocols is the key to avoid having to customize initiator and target interfaces for each embodiment.

Figure 2:
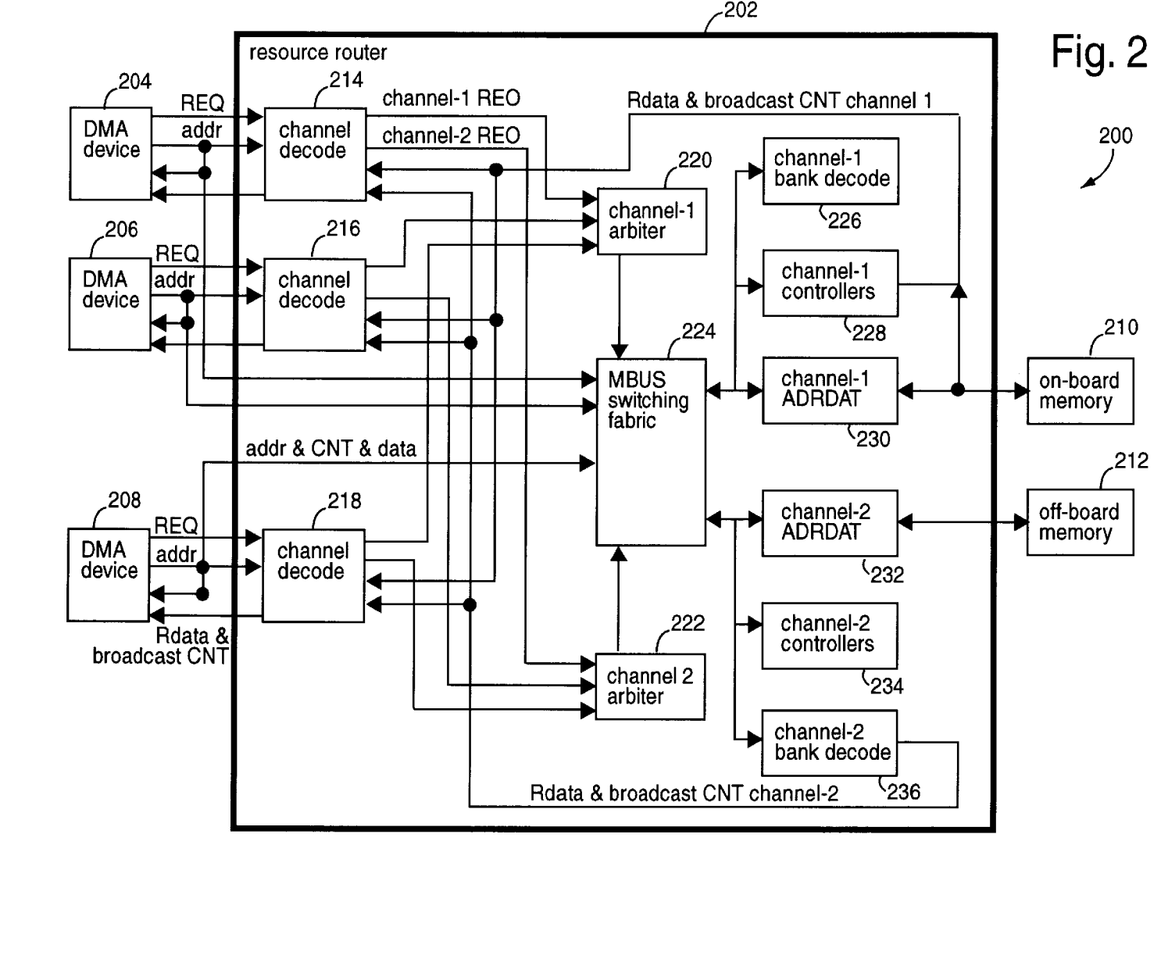
FIG. 2 is a functional block diagram of a system-resource router embodiment of the present invention for three initiators and targets on two channels.

FIG. 2 illustrates a resource router 200 implemented as a single device 202 with two channels. A set of three initiators, represented by DMA devices 204, 206, and 208, can variously be routed, for example, through the two channels to an on-board memory 210 and an off-board memory 212. A corresponding set of channel decoders 214, 216, and 218 detect initiator requests for resources and which channel is needed. A pair of arbiters 220 and 222 resolve conflicts and adjust a switch fabric 224 to connect the particular initiators to their intended resource targets. Channel-1 includes a bank decoder 226, a controller 228, and an address and data network 230. Channel-2 includes an address and data network 232, a controller 234, and a bank decoder 236.

Figure 3:
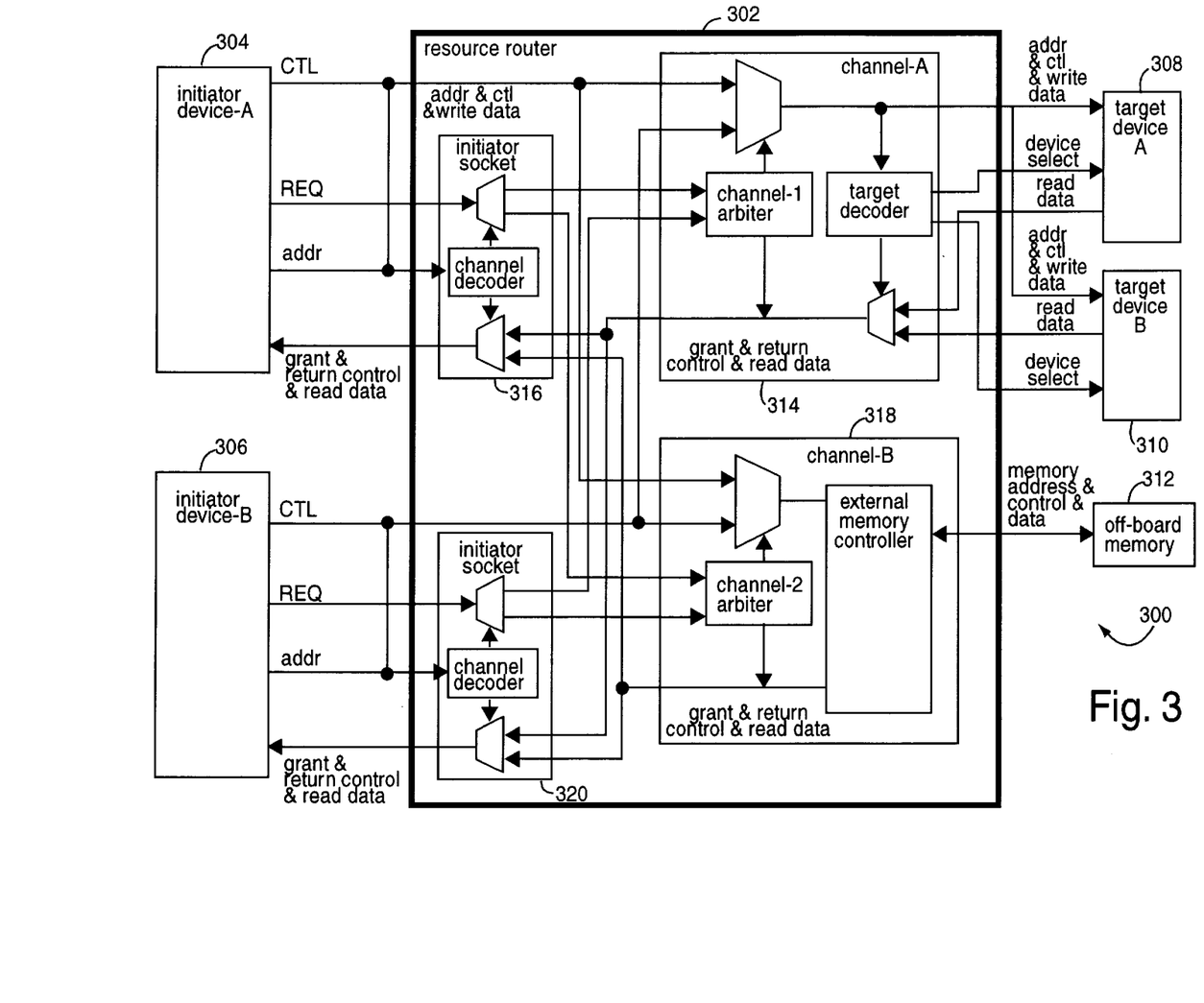
FIG. 3 is a functional block diagram of a system-resource router embodiment of the present invention for two initiators and two channels.

FIG. 3 illustrates a system-on-chip (SOC) 300 with a resource router 302 that supports two initiators 304 and 306 in accesses to a target device-A 308, a target device-B 310 and an off-board memory 312. Two internal channels are provided, a channel-A and a channel-B. A channel-A arbiter 314 resolves access conflicts to the target device-A 308 and target device-B 310. An initiator socket 316 interfaces to the initiator-A 304. A channel-B arbiter 318 resolves access conflicts to the off-board memory 312. An initiator socket 320 interfaces to the initiator-B 306.

Figure 4:
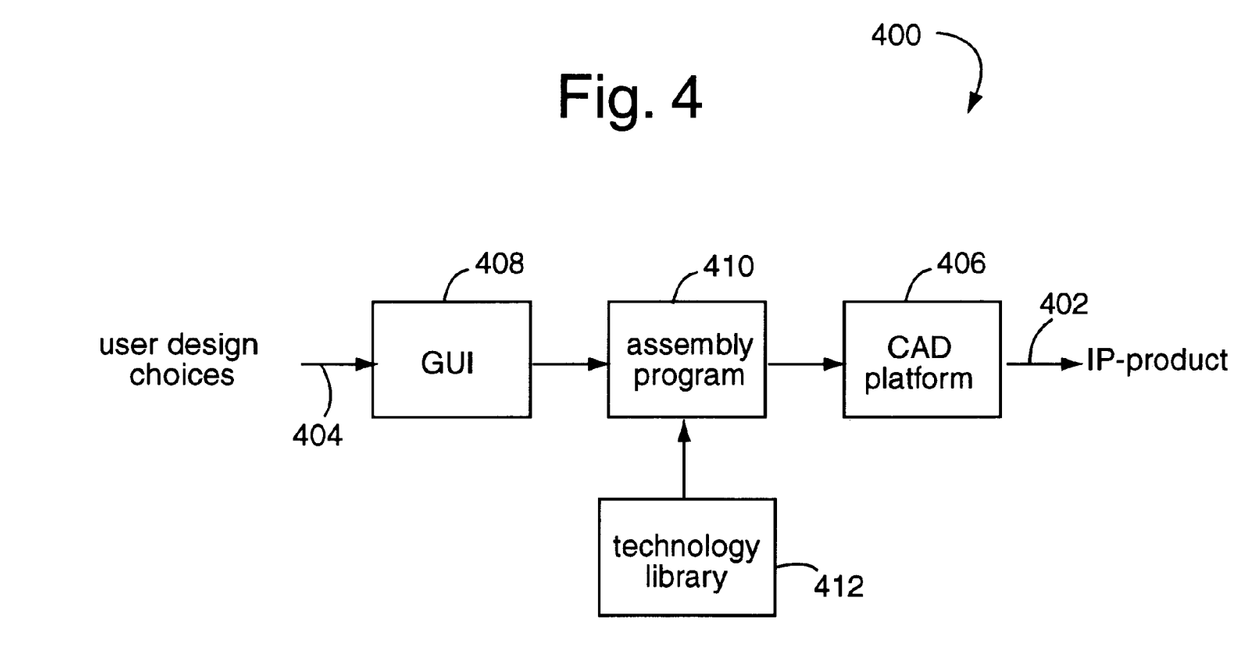
FIG. 4 is a functional block diagram of a computer-aided design system for system-resource router designs.

FIG. 4 represents a system resource router design system embodiment of the present invention, referred to herein by the general reference numeral 400. The design system 400 produces an intellectual (IP) output in the form of VHDL or Verilog computer files 402 that are dependent on a set of user design choices 404. Such choices are exemplified in Tables I–VI herein. The computer files 402 describe at least two channel sockets that provide for protocol-based connections to external data-transfer initiators, at least two internal M-channel buses, an M-channel controller for connection between an external M-channel bus and a corresponding one of the internal M-channel buses, and a transfer switch for providing alternative connections of at least one of the channel sockets to at least two of the internal M-channel buses. A plurality of processors and other initiators respectively connected to the channel sockets can be routed with the transfer switch to operate in parallel with a plurality of peripherals and memory respectively populating the external M-channel buses.

The design system 400 includes a computer-aided design (CAD) platform 406 for providing a user/designer with a means to select and implement a variety of numbers of interconnected ones of the channel sockets, the internal M-channel buses, the M-channel controllers, and the transfer switches. A graphical user interface (GUI) 408 is preferably included to collect basic information about a design application An assembly program 410 automatically chooses how many channel sockets, internal M-channel buses, M-channel controllers, and transfer switches to include from a technology library 412 in a final design based on user input through the GUI.

A business model embodiment of the present invention uses the design system 400 to profit from the commercial marketing of intellectual property (IP) hardware description language (HDL) files that are output by the CAD program 406. Such implements the channel sockets, the internal M-channel buses, the M-channel controllers, and the transfer switches as high-level synthesis (HLS) computer files for later simulation, placement, and routing in a single-chip system-on-chip implementation.

The channel switches typically decode a portion of the addresses supplied by initiators to determine to which channel the transaction is directed. The address is decoded and the request is directed to the correct channel that will be handling the transaction. The switch will not move to another channel until the transfer of data is complete. If a request is supplied from an initiator and the address supplied does not decode to a channel, an error will be generated and the system resource router will initiate an interrupt to the CPU. The error is recorded in an initiator socket error register that is preferably accessed through a control port to tell the CPU which initiator had the error. No request can be supplied for that initiator until the error register is cleared through the control port.

There are typically two types of M-channels used in system resource router embodiments. The first type is an external memory and embedded memory channel for point-to-point connections with only a single target, e.g., internal or external memory. The second type is a target and embedded memory channel which uses a configurable protocol. The user is provided with the ability to customize the protocol for particular applications.

Any external memory and embedded memory M-channels are preferably optimized for data transfer between external and internal memory. One way to do this is to configure the channel with system 400 as point-to-point with memory as the only target. Each channel can have several different memory-mapped banks of memory, and in any combination of external or embedded. External memories preferably have programmable timing to allow alternative memory devices to be used in actual production.

Each memory bank is controlled by a memory controller for asyncronous, DRAM, or SDRAM memories. A system resource router can be configured to have any reasonable combination of controllers and M-channels. Any memory bank is programmed to use any memory controller used in that M-channel. Any memory bank is configured to use any controller as the default memory controller for that bank. If a memory type is not used on any of the memory banks in that M-channel, then that controller is not placed in the design by CAD platform 406. Each bank of memory is preferably programmed in system 400 as asyncronous, DRAM, or SDRAM. Memory controllers connected to separate M-channels run independently allowing different memories connected to different M-channels to access external memory through separate memory pins.

If an asyncronous bank is programmed, then it will support flash-memory, compact flash-memory, internal or external SRAM, SSRAM, SFlash, and internal or external ROM if all the control pins are brought out as pins on the part. If a bank is programmed as SDRAM, it will support PC100-compliant SDRAM and DDR SDRAM. If EDO DRAM is programmed, it will support standard EDO and Fast Page Mode EDO DRAM.

Target device and embedded memory channels use protocols with special extensions to optimize initiator-to-target transfers. Such channel type is preferably configurable so the user can trade-off performance for gate-count, or remove extensions not needed in particular applications. The channel can have several different memory-mapped target devices or embedded memories. These target devices and embedded memories are preferably mixed in any combination.

Special extensions include full duplex and split transactions. Full duplex uses a transaction posting system that allows an initiator-A to do burst reads to a target-A at the same time an initiator-B is doing burst writes to an embedded memory-B. This can double the bandwidth of the channel, but only if bursting is being used, and only if different initiator-to-target reads and writes are happening at the same time. If two initiators are doing a read, this system will not help. And if the two initiators are trying to access the same target, this option will not help in any combination of reads and writes.

Split transactions allow reads to return across channels in different order than they were requested. This allows an initiator that is reading from a fast target to jump in and read data while an initiator that is reading from a slow target is still waiting for data. If there is a conflict, e.g., two targets try to return data at the same time, the transaction that was posted first will have priority. This helps when mixing fast and slow targets on the same channel. If all the target devices are fast, this will not improve performance much. It will also not improve writes, or if two initiators are trying to read from the same target.

Several arbitration options are preferably offered to users of the system resource router to allow throughput customization. Each M-channel has its own arbitration, and each arbitration is preferably a different type, e.g., round-robin, fixed priority, timed priority, round-robin with one fixed priority, and time-domain slicing schemes. Arbitration between initiator devices are preferably supported for each M-channel.

With round-robin arbitration, priority is passed from initiator device to initiator device starting at initiator socket-1 in a round-robin fashion until the initiator socket-1 has priority again.

With fixed priority arbitration, the priority is always fixed with M-channel connection-1 having the highest priority, and the highest-numbered M-channel connection having the lowest. In this priority scheme, it is important which device is attached to which initiator socket.

With timed priority arbitration, the initiator that is granted moves to the lowest priority and all those that had a lower priority than the granted device move up. In this way, the device that uses the bus the least has the highest priority. This method of arbitration is the fairest method but has the highest gate count.

With round-robin with one fixed priority arbitration the M-channel connection-1 always has the highest priority. The other initiators arbitrate using the round-robin arbitration method.

With time domain slicing, each initiator connected to the M-channel is allowed to have only a certain number of transactions across the M-channel before another initiator takes over the M-channel. The number transactions is programmable for each initiator connected to the Arbitration can follow any request removal and the completion of a current memory access, or it can follow any end-of-burst.

Each arbiter control register preferably has two sets of registers that are preferably used to effect the operation of the arbiter for each M-channel. One set of bits is the arbiter mask register. These bits are preferably used to mask the requests from initiator or force requests from initiator. This is useful for test development and for system debug. A second part of the arbiter control registers include arbiter force-request register bits which are used to force a bus grant from the arbiter to a specific port. This can be useful for testing and system debugging. The arbiter state registers allow the user to tell which initiator is granted by reading the register through the control port. This is typically useful for system debugging.

A watchdog timer is preferably provided as an option for the arbitration of each M-channel. Typical watchdog timers are 16-bit units that count the number of clock cycles since a device has been granted a bus request. The timer resets each time a new initiator socket or multi-master bus is granted access. The watchdog timer control register allows the user to control what happens at timeout for each initiator socket. One option is nothing happens. Another is that the watchdog timer interrupt register will be set and the watchdog timer interrupt pin will go high. The watchdog timer interrupt register tells which initiator socket timed out and is cleared upon reading the register. Once the watchdog timer interrupt register is cleared, the watchdog timer interrupt pin will go low. The third option for what happens on timeout is that the watchdog timer interrupt register is set, the watchdog timer interrupt pin goes high, and at the end of the next memory cycle the grant will be removed from the initiator.

Each initiator preferably has its own watchdog timer and timeout value register. This register is typically 8-bits long, and is loaded into the most significant bits of the 16-bit timer when an initiator is granted access. This allows the user to set specific timeout values for different ports.

Sockets are a critical element in being able to design once, and then reuse the design over and over in a plug-and-play system. Sockets bring together existing IP technology-library components, new third-party IP, and new project specific IP. Even when all are built to different interface standards, and without necessitating extensive redesign. Sockets provide address remapping, FIFO, syncing between different clock domains, and bus-width matching. This allows systems to be built without having to redesign existing or third-party IP technology-library components.

Sockets are preferably placed at any of several interfaces in the system resource router. These include the initiator interface, the interface into the M-channel, and the interface into the target. This allows the user to do such things as have a 32-bit MBus initiator running at 66 MHz, move data over a 128-bit M-channel running at 100 MHz to a 64-bit VCI target device running at 50 MHz, and configure the entire thing inside the system resource router without modifying either the MBus initiator or the VCI target.

The syncing FIFOs allow a portion of the chip running at one frequency to interface another portion running at a different frequency and have the two sides of the syncing FIFO running at optimal throughput. The difference between the syncing FIFO and the sync cell is that the throughput is about three times higher for the syncing FIFO while the sync cell has a significantly lower gate count. The difference depends on the burst length of the device. Each initiator, each channel, and each target can have it's own syncing FIFO system allowing for as many as one hundred thirty-six different clock domains for each resource router. E.g., thirty-two initiator clocks, eight M-channel clocks, and sixty-four target clocks.

The syncing FIFO consist of one FIFO for data read or write, and a four-transaction deep transaction stack. The data FIFO is preferably from two words deep to 2048 words deep and should be set to the maximum burst length times four, e.g., allowing four maximum length bursts to be pending. The syncing FIFO will work whether going from fast clock to slow clock or slow clock to fast clock or as the two clocks on the same frequency but not synced. This allows different parts of the chip to be put in power down mode and still be able to transfer data in the power down mode.

In order to prevent any data coherency problems the reads and writes into the system resource router and out to the memory are performed in the same order. Consecutive reads and writes are queued into the syncing FIFOs but when switching from a read to a write the syncing FIFOs wait until all the reads queued in the FIFOs are complete before queuing the next write operation. The FIFO status register identifies whether the initiator socket still has reads or writes pending on this M-channel.

The sync cell will syncronize two clock domains with a minimum of gate count. This cell is preferably slow since it must sync from clock domain-A to clock domain-B, and then back from clock domain-B to domain-A to complete a transfer. The syncing FIFO hides this by stacking multiple transfers at once.

The synced FIFOs work much the same way as the syncing FIFO with the exception that the clock domains are assumed to be synced together. This means that the initiator clock and the system resource router clock should be generated off the same master clock and be some multiple of each other. This multiple of the clock is supplied when the system resource router is configured. The advantage of the synced FIFO over the syncing FIFO is that it has fewer gates and has less latency from when the initiator requests the transaction to when the read or write is performed.

The system resource router supports the new VC Interface Standard. This interface is already built into the system resource router and allows VCI compliant devices to be connected without adding a bus wrapper. This includes VCI initiator, VCI target, and PVCI. This eases the integration of VCI compliant devices and allows persons familiar with VCI to connect into the system resource router without becoming familiar with another bus standard.

Address remapping is preferably preformed at several points in the system resource router and the remapping is preferably fixed or programmable through the control port allowing the user a great deal of flexibility in what the initiator memory map looks like. Each socket will allow several different sectors to be remapped. Each sector is preferably either a fixed type or a mapped type. For the fixed type an address range is selected and the programmed value out of the remap will be fixed for those address bits no matter what the input address is. For the mapped type, you specify what value you are looking for on the input address and the output value will be placed on the address output. The address pins compared on the input need not be the same address bits changed on the output address bits. The output address bits may not overlapped for a fixed and mapped sector but they can overlap for two mapped sectors only if the input address bits compared are the same. The number of address bits compared and the number of address bits changed on the output for a sector is preferably no more than 8-bits and must be consecutive.

The sockets will perform optional bandwidth matching between interfaces. What this means is that the socket will convert a 32-bit burst of four into a 64-bit burst of two (2X option) on the other side of the socket. This means that the 64-bit side will require only XX as many clock cycles to complete the transfer. Going the other way, the socket will convert a 128-bit single cycle access into a burst of four 32-bit transfers (quarter option). This capability allows initiators, channels, and targets to effectively communicate without redesigning interfaces.

A system resource router with dynamic bandwidth allocation is very similar to the above examples with the exception that internal memory and non-DMA devices or slaves are not assigned to one channel. They are assigned to multiple channels the same as the DMA or master devices. When a DMA or master requests access to an internal memory or non-DMA or slave device, both devices are switched to the first available unused channel. This process continues until all the channels are in use. If another transaction is requested the DMA or master device and non-DMA or slave device or memory will be connected to a channel based on either the speed of the ongoing transfers or the priority of the DMA or master on the channel or both. The two transactions will then share the bandwidth of that channel until either one of the transactions is complete or another channel becomes available. If a channel becomes available one of the DMA or master devices with its non-DMA or slave device or internal memory will switch to the open channel. If a DMA or master device requests a non-DMA or slave device that is already being used by another DMA or master, the requesting DMA or master is switched to the channel with the non-DMA or slave device and the two DMA or master devices arbitrate for the non-DMA or slave device. In this way the bandwidth used by the system-on-chip is always optimal and you are guaranteed maximum bandwidth utilization.

An additional method that is preferably used to increase bandwidth when the number of read and writes to or from the DMA or master devices is equal is by splitting the channel from a read/write channel to a read only channel and a write only channel. Because the internal channel architecture does not use bi-directional buses (low performance, high power consumption, and difficulties with using ASIC design tools) and there are separate mb__rdata and mb__wdata paths inside the system resource router splitting the channel requiring less overhead than adding a complete new channel.

For systems that require higher bandwidth in the write or read direction, individual channels could be defined as read-only or write-only. Thus providing additional bandwidth in one direction and optimizing system performance.

While COREFRAME implementations generally comprise a CPU and shared memory, embodiments of the present invention are preferably applied to systems with shared resources, e.g., a PCI interface. A support processor is needed only if the peripheral blocks are programmable. If such are programmed through a sequencer, no processor is needed.

There are three basic methods of interconnect for on-chip designs, (1) simple bus architecture, (2) simple bus with bridge architecture, and (3) point-to-point architecture. All three have advantages and disadvantages. System resource router embodiments of the present invention basically combine the simple bus architecture and the point-to-point architecture to exploit the advantages of each and avoid the disadvantages. For systems requiring low bandwidth, the system resource router is preferably CAD-configured down to a simple bus architecture implementation. For high bandwidth, the system resource router is preferably CAD-configured as a point-to-point architecture implementation, as well as several shades of architectural mixes in between.

Although the present invention has been described in terms of the presently preferred embodiments, it is to be understood that this disclosure is not interpreted as limiting. Various alterations and modifications will no doubt become apparent to those skilled in the art after having read the above disclosure. Accordingly, it is intended that all appended claims be interpreted as covering all alterations and modifications as fall within the true spirit and scope of the invention.

What is claimed is:

1. A system resource router, comprising:
   at least two channel sockets that provides for protocol-based connections to external data-transfer initiators;
   at least two internal M-channel buses;
   one or more M-channel controllers, wherein each said M-channel controllers connects one of a plurality of external M-channel busses to a corresponding one of the internal M-channel buses; and
   one or more transfer switches, wherein each said transfer switch provides alternative connections of at least one of the channel sockets to at least two of the internal M-channel buses;
   wherein, a plurality of processors and other initiators respectively connected to the channel sockets can be routed with the transfer switch to operate in parallel with a plurality of peripherals and memory respectively populating said external M-channel buses; and
   wherein the variety of numbers of interconnected ones of said channel sockets, said internal M-channel buses, said M-channel controllers, and said transfer switches are determined using a computer-aided design (CAD) program means.

2. The system resource router of claim 1, further including:
   a graphical user interface (GUI) included in the computer-aided design program means that collects basic information about a design application and then automatically chooses how many channel sockets, internal M-channel buses, M-channel controllers, and transfer switches to include in a final design.

3. The system resource router of claim 1, further including:

an intellectual property (IP) hardware description language (HDL) file that is output by the computer-aided design program and implements the channel sockets, the internal M-channel buses, the M-channel controllers, and the transfer switches as high-level synthesis (HLS) computer files for later simulation, placement, and routing in a single-chip system-on-chip implementation.

4. The system resource router of claim 3 wherein the IP-HDL file is such that any such implementation of the channel sockets allows after-the-fact changes in said interface protocols.

* * * * *